(12) United States Patent
Ellis et al.

(10) Patent No.: US 11,041,704 B1
(45) Date of Patent: Jun. 22, 2021

(54) METHOD OF MANUFACTURING COMPOSITE PROJECTILE BODY EMBEDDED WITH PREFORMED FRAGMENTS

(71) Applicant: U.S. Government as Represented by the Secretary of the Army, Dover, NJ (US)

(72) Inventors: Michael E. Ellis, Lake Hopatcong, NJ (US); Michael V. Bruno, Chatham, NJ (US); Deepak Kapoor, Rockaway, NJ (US); Tony F. Zahrah, Fairfax Station, VA (US); Roderick Rowland, Fairfax, VA (US); Steven C. Lawver, Sterling, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 597 days.

(21) Appl. No.: 15/658,974

(22) Filed: Jul. 25, 2017

(51) Int. Cl.
| | |
|---|---|
| *F42B 12/32* | (2006.01) |
| *F42B 33/00* | (2006.01) |
| *B22F 3/15* | (2006.01) |
| *B22F 7/08* | (2006.01) |
| *B22F 3/24* | (2006.01) |
| *B33Y 80/00* | (2015.01) |

(52) U.S. Cl.
CPC ............. *F42B 12/32* (2013.01); *B22F 3/15* (2013.01); *B22F 3/24* (2013.01); *B22F 7/08* (2013.01); *B33Y 80/00* (2014.12); *F42B 33/001* (2013.01); *B22F 2003/247* (2013.01)

(58) Field of Classification Search
CPC combination set(s) only.
See application file for complete search history.

(56) References Cited

U.S. PATENT DOCUMENTS

| | | | |
|---|---|---|---|
| 3,815,504 A | 6/1974 | Tieben | |
| 3,945,321 A | 3/1976 | Mayer | |
| 4,032,335 A | 6/1977 | Zapf | |
| 4,129,061 A | 12/1978 | Bedall | |
| 4,644,867 A | 2/1987 | Hellner | |
| 8,276,520 B1 * | 10/2012 | Fong | F42B 12/22 102/491 |
| 8,689,669 B2 * | 4/2014 | Ronn | F42B 12/32 102/496 |
| 10,018,453 B1 * | 7/2018 | McCoy | F42B 12/32 |
| 10,634,472 B1 * | 4/2020 | Bonnstetter | F42B 12/32 |
| 2016/0258727 A1 * | 9/2016 | Bruno | F42B 12/24 |
| 2017/0073281 A1 * | 3/2017 | Ackerman | F42B 12/22 |

* cited by examiner

*Primary Examiner* — Anthony J Zimmer
*Assistant Examiner* — Michael J Kachmarik
(74) *Attorney, Agent, or Firm* — John P. DiScala

(57) ABSTRACT

A method for preparing a composite projectile body with preformed fragments precisely embedded within the walls of the projectile body. The process utilizes a combination of additive manufacturing and advanced powder metallurgy fabrication techniques. Specifically a skeletal structure or prefabricated cage body is filled with preformed fragments. The cage structure may be situated on a mandrel or tool inside a container. The container is filled with metal powder, degassed under vacuum, and sealed. The canister is then subjected to heat and pressure to consolidate the powder to full density. The canister is then removed and the compacted billet product is further machined to obtain a desired projectile body.

11 Claims, 5 Drawing Sheets

METHOD OF MANUFACTURING COMPOSITE PROJECTILE BODY EMBEDDED WITH PREFORMED FRAGMENTS

RIGHTS OF THE GOVERNMENT

The inventions described herein may be manufactured and used by or for the United States Government for government purposes without payment of any royalties.

FIELD OF INVENTION

The present invention relates to methods for manufacturing composite projectile bodies having preformed fragments embedded into the casing. More specifically, the present invention is directed to a method for making a composite projectile body with preformed fragments of different materials and shapes precisely embedded within the walls of the projectile body. The composite projectile body is made by using a combination of additive manufacturing and advanced powder metallurgy fabrication techniques.

BACKGROUND OF THE INVENTION

Historically over the course of ammunition design and development, various methods have been used to improve the characteristics of exploding munitions. Such methods include improvements to the projectile body design by tailoring its structural material properties (hardness, ductility, fracture toughness etc.), embossing casing walls, implementing fragment liners, laminating casing materials, stacking fragments and embedding preformed fragments into the projectile body. While composite projectile bodies with preformed fragments are known in the art, the process for precise placement of preformed fragments into composite projectiles are unclear or require multi-step staging of the projectile body that fails to produce a cohesive final product.

U.S. Pat. No. 4,644,867 issued to Hellner and Rönn describes a shell case design having preformed fragments embedded into a metal shell case. The '867 patent suggests that the shell case design can be manufactured using powder metallurgical procedures to press together the fragments (i.e. heavy metal balls) and metal powder under high pressure and temperature. One of the inventors to the '867 patent stated, however, that the '867 patent failed to disclose how to configure the plurality of fragments so that they are in a fixed arrangement in the casing. See Col. 3 in U.S. Pat. No. 8,689,669 issued to Rönn and Gunnar Larsson The '669, patent discloses methods to prepare preformed fragmentation casing using a removable "fixture" as a guide to hold the metal ball fragments in place while the metal powder is compressed around the metal ball fragments. The method utilizes powder compaction in multiple stages to form a plurality of casing units that are later compressed together to form a final piece. The first stage utilizes the "fixture" to hold a plurality of metal ball fragments while compressed metal powder fixes half the surface of the balls in place to form a first casing unit. The second stage fixes the remaining half of the exposed metal ball surface fragments with compressed metal powder to form a second casing unit. The third stage compresses the casing units together to form the desired projectile shape. Rönn's method utilizing multiple powder compression steps as well as removing and positioning of the fixture is time consuming and not conducive to mass production methods. Thus, a need exists for a more simplified method for embedding preformed fragments in casing that reduces the introduction of cracks and fragmentation to the casing jacket.

SUMMARY OF THE INVENTION

It is an object of the invention to provide a method to manufacture a cohesive projectile body having preformed fragments embedded therein. Said method comprising the steps of: a) configuring a canister assembly having a cage body supporting a plurality of preformed fragments wherein said preformed fragments are placed in a predetermined location and design within the cage body, a mandrel and casing powder, wherein the cage body is placed on the mandrel, and wherein the metal casing powder completely surrounds the supporting cage body and preformed fragments; b) subjecting the canister assembly to elevated heat and pressure wherein the metal casing powder and the supporting cage body are metallurgically processed into a monolithic unit; wherein the monolithic unit comprises the preformed fragments completely encapsulated in the predetermined location and design without significant shifting or manipulation of the preformed fragments; and 3) machining the monolithic unit into a projectile shape.

In one aspect of the invention, the cage body is the same material as the metal casing powder, and the preformed fragments have a higher density or higher melting point than the cage body or casing material.

In another aspect of the invention, the plurality of the preformed fragments have the same shape and size.

In yet another aspect of the invention, the shape and size of the plurality of the preformed fragments vary.

In yet another aspect of the invention, the metal cage body and the metal casing powder are composed of high strength alloy steel.

In yet another aspect of the invention, the cage body is prepared by additive manufacturing, lost-wax casting, spin-casting or sheet metal forming technique.

In yet another aspect of the invention, the supporting metal cage body design comprises a spiral peforated tube, ring stack or bearing race.

In yet another aspect of the invention, the preformed fragments are in the shape of spheres, pellets or cubes.

In yet another aspect of the invention, the canister assembly is subject to hot isostatic pressing.

BRIEF DESCRIPTION OF THE DRAWINGS

Further features and advantages of the present invention may be understood from the drawings.

DETAILED DESCRIPTION

The present invention is directed to a method for manufacturing a composite projectile body with preformed fragments of different materials and shapes precisely encapsulated within the walls of the projectile body. The composite projectile body is made by using a combination of additive manufacturing and advanced powder metallurgy fabrication techniques. The process utilizes a prefabricated support structure such as a cage. The cage having channels or cavities which are designed to hold or support preformed fragments of any given shape. The cage filled with preformed fragments is then centered on a mandrel or tool inside a canister. The canister is filled with metal powder, capped, degassed under vacuum, and sealed. The canister is then subject to heat and pressure to metallurgically consolidate the powder to full density. The canister is then removed along with the mandrel and end cap and the compacted unit is machined to obtain the desired projectile body.

Figure 1:
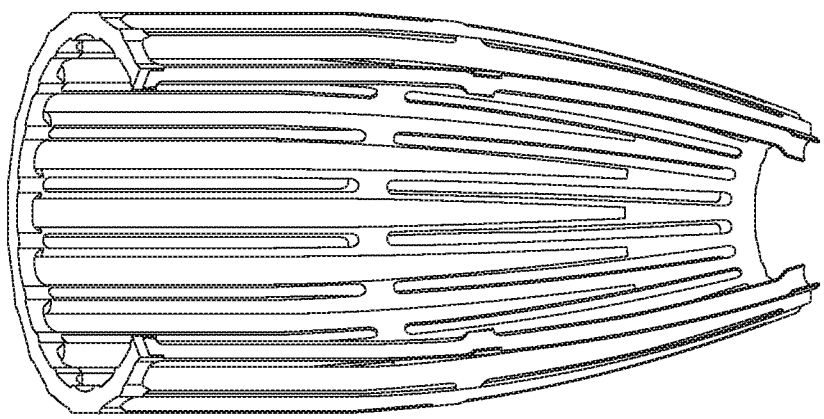
FIG. 1 is a representation of a metal cage body or fragment supporting structure. The image consists of a 90° cutout for internal visual purposes.

FIG. 1 is a representation of a prefabricated cage body 100. The objective of the cage body is to provide the support means for suspending preformed fragments in a prescribed arrangement based on a predetermined design. Use of the cage body to support the preformed fragments is advantageous over prior art methods in that the preformed fragments can be concentrated in a particular zone for saturation purposes, distributed evenly for more uniform coverage; regulated to achieve a certain projectile center of mass location; and/or the quantity, size and location can be based on achieving a certain structural response of the projectile for target perforation survivability prior to the detonation event. The cage body can be made using any manufacturing techniques such as, but not limited to, additive manufacturing (3D printing), lost-wax casting, spin-casting, or sheet metal forming such that the cage is a single cohesive unit. It is desirable that the cage has channels or cavities which are designed to hold or support the preformed fragments of any given shape and to allow powder casing material to infiltrate and encapsulate the entire cage body. Design of the cage body should maximize support for the preform fragments and infiltration of the casing powder, yet prevent movement of such fragments during subsequent metallurgical processing steps.

The cage body is to be minimally intrusive to the subsequent powder metallurgy processing because infiltration of the casing powder inside the cage is paramount to ensure the preformed fragments are completely and intimately surrounded by the casing powder with minimal resulting void potential. Since the cage body will also be in contact with the prefabricated fragments and will be fully covered by the casing powder, it is desirable for the cage body to be comprised of the same material as the casing powder to obtain a final monolithic structure and maximize mechanical properties of the projectile body. Such material may include metals such as steel, aluminum, copper, magnesium, bismuth, tin or alloys of such metals as well as reactive materials. A preferred metal is 4340 alloy steel. Representative reactive materials may include zinc-zirconium composite solid metal, aluminum-magnesium-zirconium composite solid metal, aluminum-magnesium-bismuth trioxide-iron trioxide composite solid metal.

After fabrication of the cage body, it is filled with preformed fragments. Assembly of the preformed fragments into the cage can be performed by hand, gravitational/vibrational methods, or by any other acceptable means.

Figure 2:
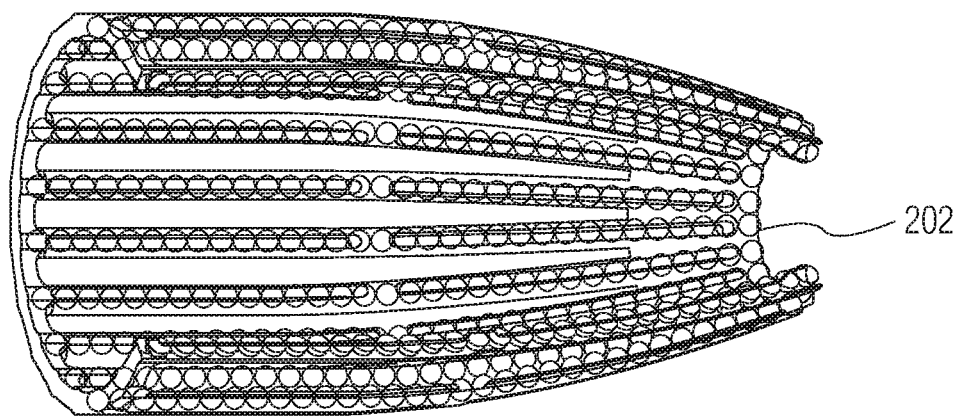
FIG. 2 is a representation of a metal cage body filled with preformed fragments in a prescribed manner. The image consists of a 90° cutout with the cage transparent for internal visual purposes. In this figure, the preformed fragments are in spherical form.

FIG. 2 is a representation of a prefabricated cage body 200 filled with preformed fragments 202 in a prescribed manner. The selection of the shape, material, size, quantity, arrangement and positioning of the preformed fragments are determined through ammunition design practices for ballistic performance. Each of these considerations must be balanced against the resulting mass properties, structural integrity, terminal lethality, cost and manufacturing limitations to arrive at a final design. Likewise, the casing material selection, caliber, shape, interior explosive volume, subcomponent interface, next level assembly constraints and conditions, costs and manufacturing limitations are designed and engineered to satisfy operational needs. While any geometric shape is contemplated for the preformed fragments, spheres, pellets or cubes are preferred, and more preferred are spherical shapes. It is further suggested that the preformed fragments be composed of materials having a higher melting point and a higher density than that of the casing material. Exemplary materials for the preformed fragments include tungsten, steel and reactive materials that release thermodynamic energy when subjected to a specific stimulus. Exemplary reactive materials include zinc-zirconium composite solid metal, aluminum-magnesium-zirconium composite solid metal, aluminum-magnesium-bismuth trioxide-iron trioxide composite solid metal.

The cage body supporting the preformed fragments may be set on and around a mandrel or any supporting tool to minimize the post machining of the interior of the final product. The mandrel or tool material is selected to support the cage structure and prevent the preformed fragments from displacement during pressing. The mandrel or tool is first coated with a heat and chemical resistant ceramic such as boron nitride to prevent the casing powder from bonding to it during the hot isostatic pressing operation. This assembly is then centered within a canister that can tolerate high amounts of heat and pressure, such as stainless steel. The canister is filled with casing powder and covered with a lid and stem assembly. The mandrel base and lid and stem assembly are welded to the canister at each end to seal the processing assembly. This assembly is then degassed under elevated temperature and vacuum followed by the pinching of the stem to ensure a completely tight seal and containment.

Figure 3:
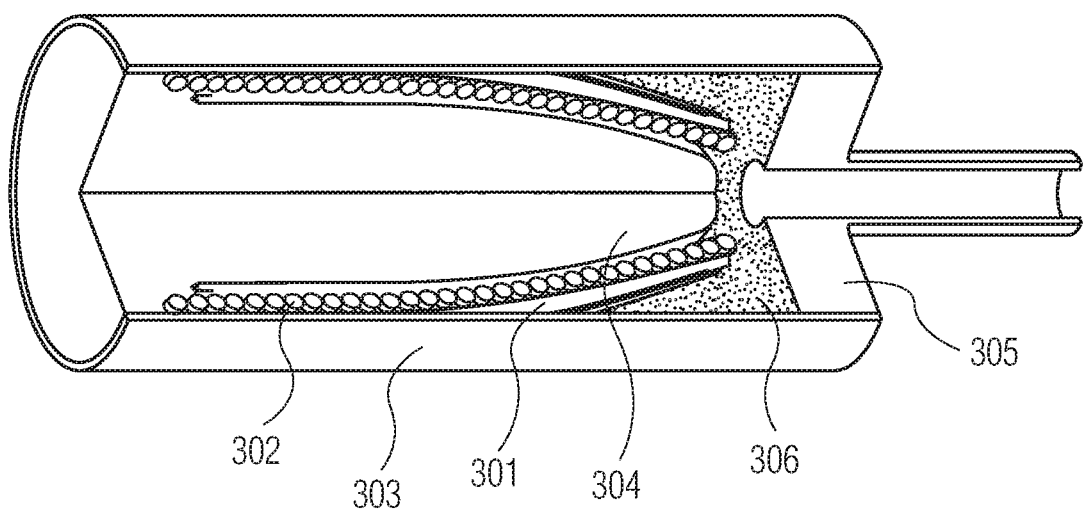
FIG. 3 is a representation of a metal cage body filled with preformed fragments arranged in a hot isostatic pressing canister with an internal mandrel and lid. The canister is filled with powder metal that forms the casing that encapsulates the prearrangement of preformed fragment spheres supported by the cage.

FIG. 3 provides an illustration of the cage body, preformed fragment and canister arrangement. The cage body 301 filled with preformed fragments 302 is arranged in a hot isostatic pressing canister 303 with an internal mandrel 304 and lid 305. The canister is filled with powder metal 306 that forms the casing that encapsulates the prearrangement of preformed fragment spheres supported by the cage.

The canister assembly is placed inside a hot isostatic press. The host isostatic press is then heated and pressurized to a pre-determined maximum pressure and maximum temperature for the selected casing powder material. At an elevated temperature below the melting point of the casing material, a pressurized inert gas such as argon consolidates the canister. The high temperature, high pressure operation turns the powdered metal casing into a solid monolithic piece near the theoretical maximum density of the material.

Processing parameters (time, temperature, pressure, et al) are as prescribed for the casing material and desired resultant product.

Figure 4A:
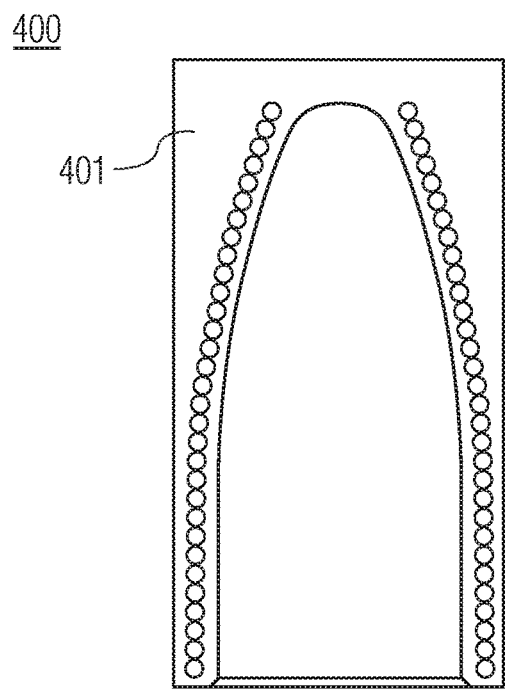
FIG. 4A is a representation of the as-pressed composite product after removal of the canister, mandrel and lid and before the casing material is machined into the desired shape.
Figure 4B:
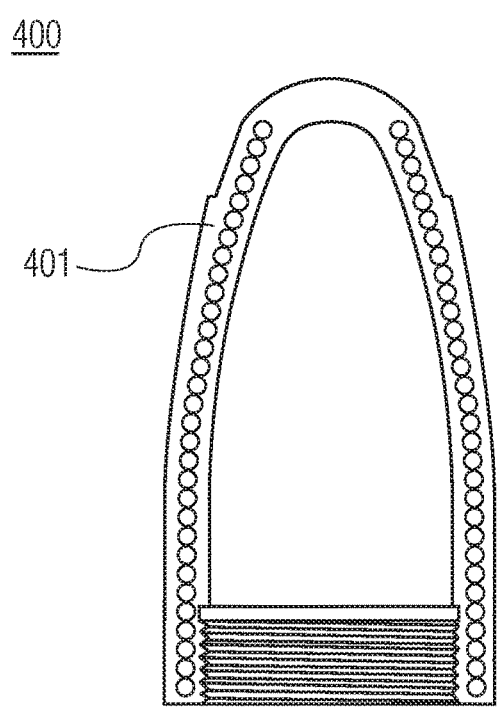
FIG. 4B is a representation of the casing material that is machined into a desired final size and profile of the projectile body design.

After the entire assembly is cooled, the top and bottom lids are cut off and the canister is machined from the consolidated piece and the mandrel removed. In FIG. 4A, the integrated compacted billet 400, surrounded by casing material 401, is then final machined to the desired size and profile of the projectile body design illustrated in FIG. 4B.

Figure 5:
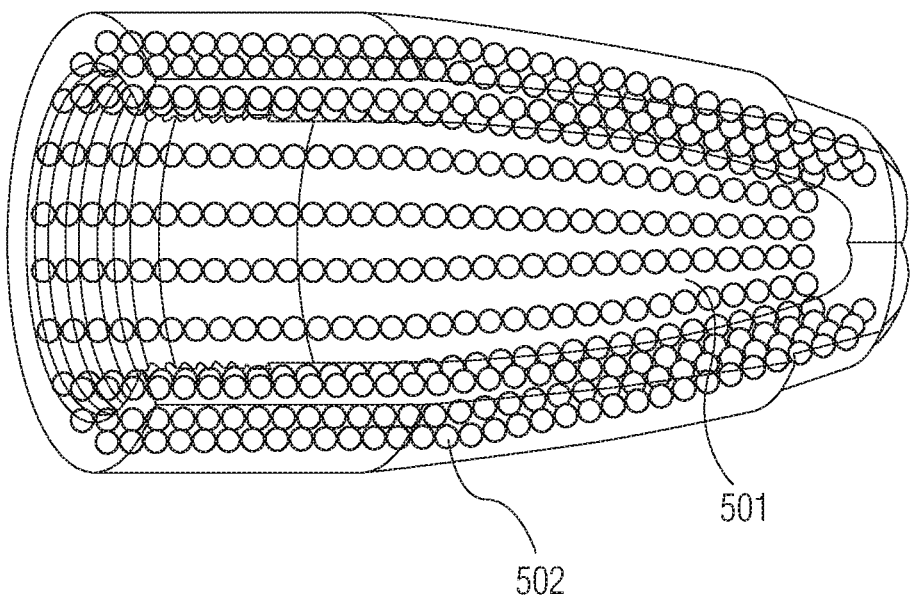
FIG. 5 is a representation of the final projectile body product with the supporting cage integral with the casing as a by-product of the hot isostatic press operation. The image consists of a 90° cutout with the casing transparent for internal visual purposes.

FIG. 5 is an illustration of the final projectile product 500 with the cage body seamlessly integrated (cage body no longer discernable) with the solid casing 501 as a by-product of the hot isostatic press operation. The composite structure has undergone post hoc isostatic press machining to form the projectile body into its ballistic shape for use in the next assembly of the explosive munition. The preformed fragment spheres 502 are suspended in the hardened metallic casing 501 with no remaining evidence of the supporting cage body. In this figure, the preformed fragment spheres may be in contact with each other in the longitudinal direction, such contact is not necessary and may be avoided by modifying the cage design. For instance, a ladder, window, or shelf design could hold the preform fragments in the longitudinal direction and a bearing race or bearing cage can hold the preform fragments in the radial direction.

Example

The following is an exemplary manufacturing process for the composite projectile body using hot isostatic pressing. This manufacturing technique involves the following steps: (1) hot isostatic pressing canister design and manufacture; (2) tooling design and manufacture; (3) metal cage design and manufacture; (4) canister packing, degassing under temperature and vacuum and sealing; (5) hot isostatic press consolidation; and (6) machining to final shape and heat treating for mechanical properties. First, a hot isostatic pressing canister is made from cylindrical tubing. The tubing material depends on the temperature for hot isostatic press consolidation. For this composite projectile body, stainless steel tubing is used for processing at 1250° C. Second, a stainless steel mandrel, the tooling, is designed to best match the interior cavity of the projectile body while still allowing withdrawal after hot isostatic pressing. The tooling is coated with boron nitride to prevent bonding with the surrounding structure and centered inside the stainless steel canister on a bottom stainless steel lid that is welded to the canister. Third, a metal cage body is designed to hold preformed fragments. The design includes channels to hold the desired preformed fragment size and shape. The cage is preferably made from the same material as the final product casing, but a material from a similar material class is also permissible. In this application, a stainless steel cage was fabricated via additive manufacturing. The cage body is then loaded with preformed spherical tungsten fragments and placed around the mandrel inside the canister. Fourth, the canister is filled with 4340 powdered steel that completely encapsulates the preformed fragments. The filled canister is then capped with a lid which is welded to the canister and degassed under vacuum via a stem in the lid. The degassing operation consists of heating the canister assembly to a temperature in the range of about 250° C. to about 325° C. at a vacuum of $1 \times 10^{-3}$ torr. These conditions are held for 48 hours and then free cooled to room temperature after which the canister is hermetically sealed by crimping the stem. Fifth, the sealed canister is loaded in a hot isostatic press and consolidated under temperature and pressure. The maximum temperature, pressure and soak time depend on the powder material. For this 4340 steel composite projectile body, the heating rate is between 5° C. and 10° C./minute. Pressure is also gradually increased to a maximum of 30 ksi. The pressure is then held constant as the temperature is increased from about 1000° C. to about 1250° C. These maximum conditions are held for 1 to 4 hours after which pressure is gradually decreased as the consolidated piece is free cooled back to ambient temperature. Sixth, after consolidation, the top and bottom lids on the canister are cut and the mandrel is removed. The outside of the canister, as well as the inner and outer diameters of the consolidated casing is machined and heat treated to attain the desired projectile body profile and mechanical properties.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description but by the claims and any equivalents.

What is claimed is:

1. A method for manufacturing a projectile body embedded with preformed fragments comprising:
    fabricating a cage body comprising a circular ring shaped base and a plurality of ribs extending axially forward from the circular ring shaped base thereby forming the shape of a projectile body, said plurality of ribs each comprising a hollow interior volume defining a continuous longitudinal channel extending along a length of said rib for holding a plurality of spherical preformed fragments oriented in a line along the length of said rib by directly contacting the preformed fragments;
    loading the cage body with the plurality of preformed fragments by placing said preformed fragments within said plurality of continuous longitudinal channels via an opening in each of the plurality of ribs;
    placing the cage body around a mandrel within a canister;
    filling the canister with metal casing powder, and wherein the metal casing powder completely surrounds the cage body and plurality of preformed fragments;
    subjecting the canister assembly to elevated heat and pressure conditions wherein the metal casing powder and the supporting cage body are metallurgically processed into a monolithic unit; wherein the monolithic unit comprises the preformed fragments completely encapsulated in the predetermined location; and
    machining the monolithic unit into a projectile shape.

2. The method of claim 1, wherein the cage body is the same material as the metal casing powder, and the preformed fragments have a higher density and higher melting point than the cage body material.

3. The method of claim 1, wherein the plurality preformed fragments have the same shape and size.

4. The method of claim 1, wherein the metal cage body and the metal casing powder are composed of high strength alloy steel.

5. The method of claim 1, wherein the cage body is prepared by a technique selected from the group consisting of additive manufacturing, lost-wax casting, spin-casting, or sheet metal forming.

6. The method of claim 1, wherein the preformed fragment material has a higher melting point than the casing material.

7. The method of claim 1, wherein the preformed fragment material has a higher density than the casing material.

8. The method of claim 1, wherein the canister assembly is subject to hot isostatic pressing.

9. The method of claim 1, wherein the supporting cage body is comprised of a metal or metal alloy selected from the group consisting of steel, aluminum, copper, magnesium, bismuth, or tin.

10. The method of claim 1, wherein the supporting cage body is comprised of a reactive metal selected from the group consisting of zinc-zirconium composite solid metal, aluminum-magnesium-zirconium composite solid metal, or aluminum-magnesium-bismuth trioxide-iron trioxide composites solid metal.

11. The method of claim 1, wherein the preformed fragment is comprised of tungsten, steel or reactive material.

* * * * *